United States Patent
Lida et al.

(10) Patent No.: US 10,298,518 B2
(45) Date of Patent: May 21, 2019

(54) CREATING BI-DIRECTIONAL CO-SHARED SESSIONS AND SWITCHING BI-DIRECTIONAL CO-SHARED SESSIONS

(71) Applicant: Valens Semiconductor Ltd., Hod Hasharon (IL)

(72) Inventors: Eyran Lida, Kfar Ha-Oranim (IL); Nadav Banet, Kadima (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 0 days.

(21) Appl. No.: 15/815,886

(22) Filed: Nov. 17, 2017

(65) Prior Publication Data

US 2018/0077082 A1    Mar. 15, 2018

Related U.S. Application Data

(62) Division of application No. 15/223,295, filed on Jul. 29, 2016, now Pat. No. 9,998,398.

(Continued)

(51) Int. Cl.
*H04L 12/927* (2013.01)
*H04L 12/727* (2013.01)
(Continued)

(52) U.S. Cl.
CPC ........ *H04L 47/805* (2013.01); *H04L 41/0896* (2013.01); *H04L 45/121* (2013.01);
(Continued)

(58) Field of Classification Search
CPC ... H04L 47/805; H04L 45/121; H04L 47/728; H04L 47/283; H04L 47/801; H04L 47/726; H04L 41/0896; H04N 21/00
(Continued)

(56) References Cited

U.S. PATENT DOCUMENTS 8,082,447 B2    12/2011 Beser
8,837,349 B2    9/2014 Yabo et al.
(Continued)

OTHER PUBLICATIONS

Resource ReSerVation Protocol (RSVP).
(Continued)

*Primary Examiner* — Brenda H Pham
(74) *Attorney, Agent, or Firm* — Active Knowledge Ltd.

(57) ABSTRACT

Methods and systems for fast switching between bi-directional co-shared sessions having different network paths over a resource reservation network. Embodiment of one method includes: creating a bi-directional parent session ($S_p$) between first and second session partners, creating a bi-directional derivative session ($S_d$) between the first session partner and a third session partner, and reassigning a predetermined amount of co-shared network resources (PA-CSNR) assigned to the $S_p$ using the following steps: (i) sending a first message to request the second session partner to stop using the PA-CSNR, (ii) sending a second message to register whether the PA-CSNR are assigned to the $S_d$, and (iii) sending a third message to allow the third session partner to utilize at least some of the PA-CSNR for the $S_d$.

8 Claims, 7 Drawing Sheets

Related U.S. Application Data

(60) Provisional application No. 62/263,746, filed on Dec. 7, 2015, provisional application No. 62/209,414, filed on Aug. 25, 2015.

(51) Int. Cl.

| | | |
|---|---|---|
| *H04L 12/911* | (2013.01) | |
| *H04L 12/841* | (2013.01) | |
| *H04N 21/00* | (2011.01) | |
| *H04L 12/24* | (2006.01) | |
| *H04L 29/06* | (2006.01) | |

(52) U.S. Cl.
CPC .......... *H04L 47/283* (2013.01); *H04L 47/726* (2013.01); *H04L 47/728* (2013.01); *H04L 47/801* (2013.01); *H04N 21/00* (2013.01); *H04L 69/04* (2013.01)

(58) Field of Classification Search
USPC ......... 370/327, 395.2, 395.3, 401, 402, 322, 370/329
See application file for complete search history.

(56) References Cited

U.S. PATENT DOCUMENTS

| | | | |
|---|---|---|---|
| 9,998,397 | B2 | 6/2018 | Lida et al. |
| 9,998,398 | B2 | 6/2018 | Lida et al. |
| 2006/0133272 | A1 | 6/2006 | Yuan et al. |
| 2007/0067387 | A1 | 3/2007 | Jain et al. |
| 2009/0077237 | A1 | 3/2009 | Brehon et al. |
| 2009/0135729 | A1* | 5/2009 | Saffre .................... H04L 45/22 370/252 |
| 2010/0317363 | A1 | 12/2010 | Bai et al. |
| 2014/0341016 | A1 | 11/2014 | Kini |
| 2015/0003232 | A1 | 1/2015 | Friskney et al. |
| 2015/0319213 | A1* | 11/2015 | Lida .................... H04L 12/6418 709/219 |
| 2016/0014072 | A1 | 1/2016 | Mongazon-Cazavet et al. |

OTHER PUBLICATIONS

Pan, P., & Schulzrinne, H. (Aug. 1, 1997). YESSIR: A simple reservation mechanism for the Internet. ACM SIGCOMM Computer Communication Review, 29(2), 89-101.

Kreifeldt, R., Chang, A., Huotari, A. J., Kim, Y., Lewis, K., & Stanton, K. B. (Jul. 30, 2009). AVB for professional A/V use. AVnu white paper. Jul. 1, 3.

Pannell, D. (2010). AVB Latency Math. vol. 5(802.1), 1-43.

IEEE Computer Society, Audio Video Bridging (AVB) Systems, Sep. 30, 2011, IEEE Std 802.1BA™-2011.

Braden, R., Zhang, L., Berson, S., Herzog, S., & Jamin, S. (1997). RFC 2205-Resource ReSerVation Protocol (RSVP)—version 1 functional specification. Standards Track RFC.

RSVP Reservation Styles Technical Documentation Support Juniper Networks, Apr. 27, 2015.

White, P. P., & Crowcroft, J. (1998). A case for dynamic sender-based reservations in the Internet. Journal of High Speed Networks, 7(2), 159-185.

Rudkin, S., Grace, A., & Whybray, M. W. (1997). Real-time applications on the Internet. BT Technology Journal, 15(2), 209-225.

Yun, H., Yao, G., Pellizzoni, R., Caccamo, M., & Sha, L. (2012). Memory access control in multiprocessor for real-time systems with mixed criticality.

\* cited by examiner

CREATING BI-DIRECTIONAL CO-SHARED SESSIONS AND SWITCHING BI-DIRECTIONAL CO-SHARED SESSIONS

CROSS-REFERENCE TO RELATED APPLICATIONS

This Application is a Divisional of U.S. application Ser. No. 15/223,295, filed Jul. 29, 2016. U.S. Ser. No. 15/223,295 claims priority to U.S. Provisional Patent Application Ser. No. 62/209,414, filed Aug. 25, 2015, and claims priority to U.S. Provisional Patent Application Ser. No. 62/263,746, filed Dec. 7, 2015.

BACKGROUND

A resource reservation network, as used herein, is a network that supports reservation of bandwidth for a session. Optionally, the resource reservation network also supports reservation of end-to-end latency for the session, end-to-end latency variation for the session, and/or max burst size.

Establishing a new session over a network takes a period of time that is usually a function of the complexity of the network. In a resource reservation network there is also a need to verify that the network can support the resources guaranteed in a reservation in essentially any load condition, which may increase the session admission time.

In the case of multiple high-bandwidth sessions, the prior art resource reservation networks may not support establishment of multiple high-bandwidth sessions in parallel because the prior art resource reservation network may not have enough network resources (such as bandwidth, and/or ability to guarantee maximum latency and/or maximum latency variation) to support an existence of multiple high-bandwidth sessions in parallel.

SUMMARY

In one embodiment, a method for fast switching between bi-directional co-shared sessions having different network paths over a resource reservation network, includes: creating a bi-directional parent session ($S_p$) between first and second session partners, by: allocating co-shared network resources over a first network hop directly connected to the first session partner, and allocating network resources over a second network hop directly connected to the second session partner; creating a bi-directional derivative session ($S_d$) between the first session partner and a third session partner, by: allocating network resources to the $S_d$ over a third network hop directly connected to the third session partner, and not allocating specifically for the $S_d$ all the network resources required for the $S_d$ over the first network hop; and reassigning a predetermined amount of the co-shared network resources (PA-CSNR) assigned to the $S_p$ using the following steps: (i) sending a first message, from the first session partner to the second session partner, to request the second session partner to stop using the PA-CSNR, (ii) sending a second message from the second session partner to the first session partner, wherein each of the network entities that operates the co-shared network resources for the $S_p$ registers in the second message whether it is set to assign the PA-CSNR to the $S_d$, and (iii) sending a third message, from the first session partner to the third session partner, which allows the third session partner to utilize at least some of the PA-CSNR for the $S_d$.

In another embodiment, a resource reservation network, includes: a session creation module (SCM) configured to create a bi-directional parent session ($S_p$), between first and second session partners, by: allocating co-shared network resources over a first network hop directly connected to the first session partner, and allocating network resources over a second network hop directly connected to the second session partner; the SCM is further configured to create a bi-directional derivative session ($S_d$) between the first session partner and a third session partner, by: allocating network resources to the $S_d$ over a third network hop that is directly connected to the third session partner, and not allocating specifically for the $S_d$ all the network resources required for the $S_d$ over the first network hop; and the SCM is further configured to reassign a predetermined amount of the co-shared network resources (PA-CSNR) assigned to the $S_p$ using the following steps: (i) sending a first message, from the first session partner to the second session partner, to request the second session partner to stop using the PA-CSNR, (ii) sending a second message from the second session partner to the first session partner, wherein each of the network entities that operates the co-shared network resources for the $S_p$ registers in the second message whether it is set to assign the PA-CSNR to the $S_d$, and (iii) sending a third message, from the first session partner to the third session partner, which allows the third session partner to utilize at least some of the PA-CSNR for the $S_d$.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings.

DETAILED DESCRIPTION

In one embodiment, in order to allow fast switching between different sessions that cooperate utilizing shared network resources (denoted co-shared sessions), a network controller may establish a parent session ($S_p$) and allocate cooperative shared network resources (denoted co-shared network resources) to guarantee bandwidth and latency variation for the $S_p$. Then the network controller may establish a derivative session ($S_d$), which utilizes at least some of the co-shared network resources. The $S_d$ is allowed to stream data below the maximum bandwidth of the $S_p$, and the network resources allocated to $S_d$ guarantee bandwidth and latency variation for the $S_d$.

Figure 1:
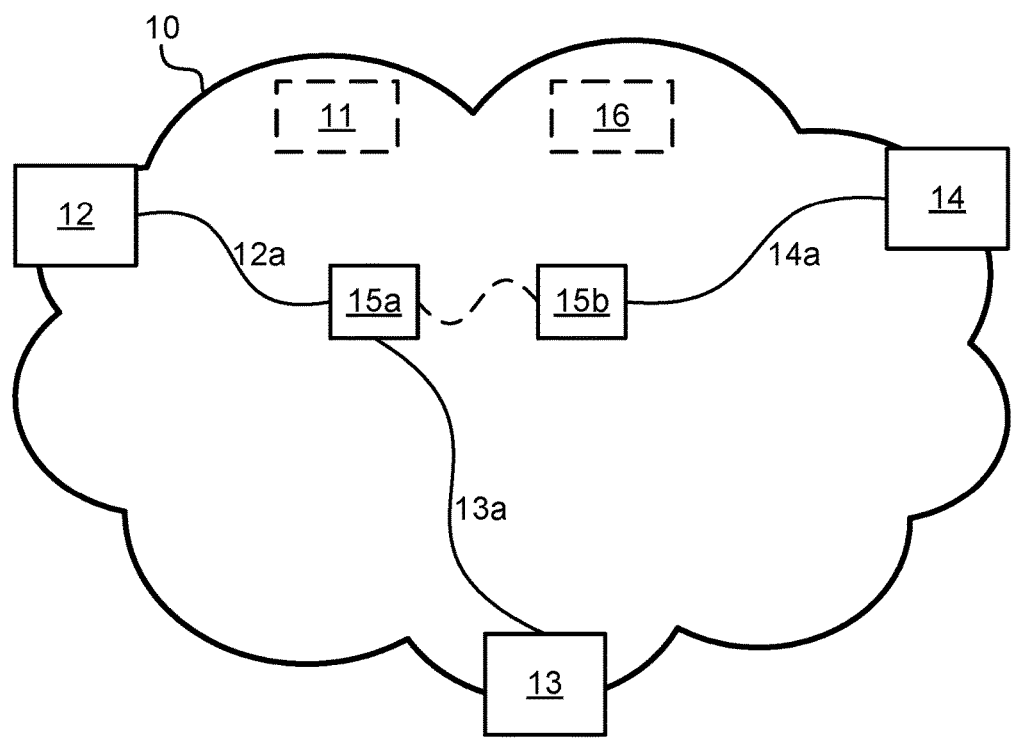
FIG. 1 illustrates one embodiment of a resource reservation network that supports bi-directional co-shared sessions.

FIG. 1 illustrates one embodiment of a resource reservation network 10 that supports bi-directional co-shared sessions. A session creation module (SCM) 11 creates a bi-directional parent session ($S_p$), between a first session partner 12 and a second session partner 13, by: allocating co-shared network resources over a first network hop 12a directly connected to the first session partner 12, and allocating network resources over a second network hop 13a directly connected to the second session partner 13. The first network hop 12a and the second network hop 13a are connected through a network entity 15a, such as a network router and/or a network switch in the case of a packet switching network. After creating the $S_p$, all the data packets traveling in either direction of the $S_p$ are guaranteed to travel over the first and second network hops.

The SCM 11 may also create a bi-directional derivative session ($S_d$) between the first session partner 12 and a third session partner 14, by: allocating network resources to the $S_d$ over a third network hop 14a that is directly connected to the third session partner 14, and not allocating specifically for the $S_d$ all the network resources required for the $S_d$ over the first network hop 12a. After creating the $S_d$, all data packets traveling in either direction of the $S_d$ are guaranteed to travel over the first and third network hops.

The first network hop 12a and the third network hop 14a are illustrated in FIG. 1 as connected through network entities 15a and 15b, respectively. However, network entities 15a and 15b may be the same network entity, may be connected through a single network hop, or may be connected through multiple network hops. Examples of network entities suitable for the network entities 15a and 15b include network routers and/or network switches. The same is also applicable for the network connection between the first network hop 12a and the second network hop 13a, and to other embodiments describes herein.

The resource reservation network 10 further includes a network controller 16 to manage fast switching between transmitting over the $S_p$ to transmitting over the $S_d$, and vice versa. The fast switching takes less than half the time required to create a new bi-directional session over the first and third network hops, and may take even less than one-tenth of the time required to create the new bi-directional session over the first and third network hops. In one example, the network is able to switch between transmitting over the $S_p$ to transmitting over the $S_d$ in less than 10 milliseconds.

Although the SCM 11 and the network controller 16 are illustrated in FIG. 1 as different network entities, the SCM 11 and the network controller 16 may be implemented by the same network entity. For example, the SCM 11 may be implemented by the network controller 16. Additionally, a single network controller may send all the network control messages necessary to command the network elements, along the $S_p$ and the $S_d$, to change the distribution of session properties between the $S_p$ and the $S_d$. In another example, the SCM 11 is implemented by the network controller 16, and a single network controller may send all the network control messages necessary to command the network elements, along the $S_p$ and the $S_d$, to switch between the $S_p$ and the $S_d$. In still another example, the SCM 11 and the network controller 16 may be implemented by the first session partner 12. Additionally or alternatively, the SCM 11 and/or the network controller 16 may be implemented by a central control point that may be coupled to the resource reservation network 10 through a network interface, or be an integral part of the resource reservation network 10.

In some embodiments, is no need to allocate specifically for the $S_d$ all the network resources required for the $S_d$ over the first network hop because the $S_d$ co-shares the network resources over the first network hop with the $S_p$, and these network resources are reserved to the co-shared sessions. In one example, no additional bandwidth allocations over the first network hop are performed (in addition to the allocation of the co-shared network resources) in order to add one or more $S_d$. In another example, a partial additional bandwidth allocation over the first network hop is performed in order to add one or more $S_d$. In this example, the partial additional bandwidth allocation adds less bandwidth than the maximum aggregative bandwidth used by the one or more $S_d$. In still another example, a partial additional bandwidth allocation is performed over the first network hop in order to add one or more $S_d$. In this example, the partial additional bandwidth allocation adds less than 50% of the maximum aggregative bandwidth used by the one or more $S_d$ over the first network hop.

It is noted that sentences such as "a network hop directly connected to a session partner" mean that the network hop is the closest network hop coupled to the session partner. The closest network hop is still considered to be directly connected to the session partner when it is coupled to the session partner through an adaptor and/or a point-to-point link able to serve just the session partner (and therefore is not part of the shared network).

Figure 7A:
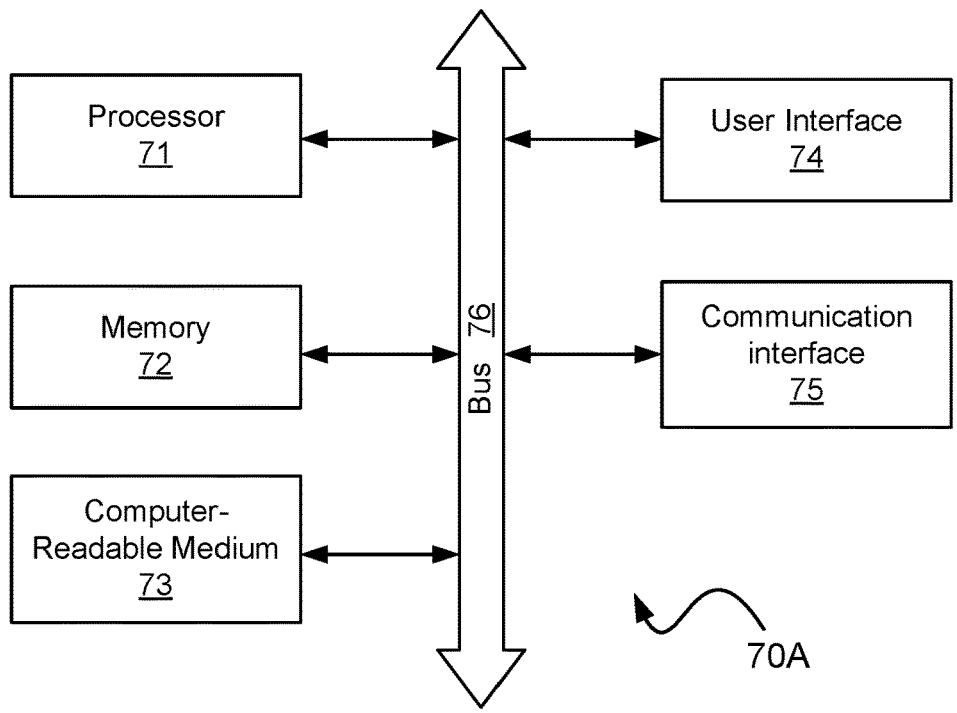
FIG. 7A and FIG. 7B are schematic illustrations of possible embodiments for the session creation module (SCM) that are able to realize one or more of the embodiments discussed herein.
Figure 7B:
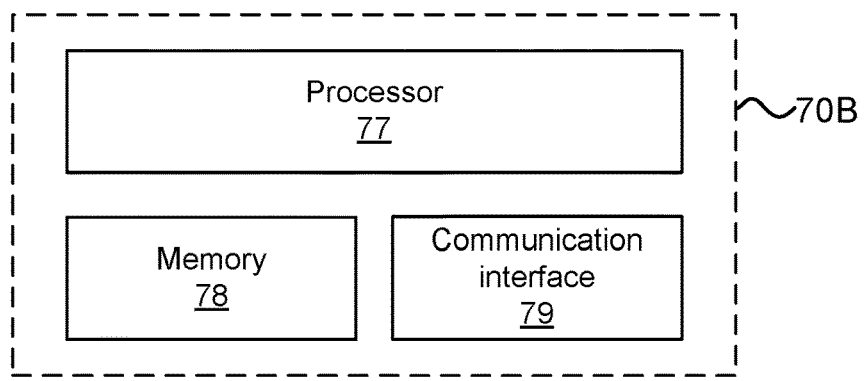

FIG. 7A and FIG. 7B are schematic illustrations of possible embodiments for the session creation module (SCM) that are able to realize one or more of the embodiments discussed herein. The SCM (70A, 70B) may be implemented in various ways, such as, but not limited to, a computer, a server, a client, a network device, computing devices embedded in a network switch, and/or any other computer form capable of executing a set of computer instructions. Further, references to a SCM include any collection of one or more computers and/or electronic circuits that individually or jointly execute one or more sets of computer instructions to perform any one or more of the disclosed embodiments. The SCM (70A, 70B) may include one or more of the following components: processor (71, 77), memory (72, 78), computer readable medium 73, user interface 74, communication interface (75, 79), and bus 76. In one example, the processor 71 may include one or more of the following components: a general-purpose processing device, a microprocessor, a central processing unit, a complex instruction set computing (CISC) microprocessor, a reduced instruction set computing (RISC) microprocessor, a very long instruction word (VLIW) microprocessor, a special-purpose processing device, an application specific integrated circuit (ASIC), a field programmable gate array (FPGA), a digital signal processor (DSP), a distributed processing entity, and/or a network processor. Continuing the example, the memory 72 may include one or more of the following memory components: CPU cache, main memory, read-only memory (ROM), dynamic random access memory (DRAM) such as synchronous DRAM (SDRAM), flash memory, static random access memory (SRAM), and/or a data storage device. The processor 71 and the one or more memory components may communicate with each other via a bus, such as bus 76.

Optionally, the resource reservation network illustrated in FIG. 1 further includes a processor that executes a routing protocol to create the $S_p$ and the $S_d$. Optionally, the $S_p$ utilizes the same $S_p$ ID for both directions. Additionally or alternatively, the $S_d$ utilizes the same $S_d$ ID for both directions. Optionally, the $S_d$ utilizes the co-shared network resources, and the SCM does not allocate specifically for the $S_d$ any network resources over the first network hop. And optionally, the resource reservation network is an HDBaseT® network, and allocating network resources to a session includes allocating network bandwidth to the session.

In one embodiment, method for creating bi-directional co-shared sessions over a resource reservation network includes the following steps: In step 1, creating a bi-directional parent session ($S_p$), between first and second session partners, by: allocating co-shared network resources over a first network hop directly connected to the first session partner, and allocating network resources over a second network hop directly connected to the second session partner. The $S_p$ guarantees that all data packets traveling in either direction of the $S_p$ are traveling over the first and second network hops.

And in step 2, creating a bi-directional derivative session ($S_d$) between the first session partner and a third session partner, by: allocating network resources to the $S_d$ over a third network hop directly connected to the third session partner, and not allocating specifically for the $S_d$ all the network resources required for the $S_d$ over the first network hop. The $S_d$ guarantees that all data packets traveling in either direction of the $S_d$ are traveling over the first and third network hops.

Optionally, the method further includes switching between transmitting over the $S_p$ to transmitting over the $S_d$ in less than half of the time required to create a new bi-directional session over the first and third network hops. Additionally or alternatively, the method further includes a single network controller that sends all the network control messages necessary to command the network elements, along the $S_p$ and the $S_d$, to change distribution of session properties between the $S_p$ and the $S_d$. Additionally or alternatively, the method further includes a single network controller that sends all the network control messages necessary to command the network elements, along the $S_p$ and the $S_d$, to switch between the $S_p$ and the $S_d$. Additionally, the network controller may be implemented by a session partner directly connected to the first network hop. Additionally or alternatively, the network controller may be implemented by a central control point coupled to the resource reservation network. In one example, the resource reservation network is an asymmetric network, and the single network controller sends all the network control messages necessary to command the resource reservation network to invert its asymmetric directionality. Optionally, the method further includes utilizing a routing protocol while creating the $S_p$ and the $S_d$. In one example, utilizing the routing protocol guarantees that all the data packets, traveling in either direction of the bi-directional session, travel over the same network path, even when the packets require different QoS.

Still referring to the method, the $S_p$ may utilize the same $S_p$ identification value (ID) for both directions. Additionally, the $S_d$ may utilize the same $S_d$ ID for both directions. In some cases, using the same session ID for both directions may simplify the network. Additionally or alternatively, using the same session ID for both directions enables the network elements along the path to determine how to route the packets in both directions along the same path, which is possible because both directions along the same path use the same session ID. Optionally, the $S_d$ utilizes the co-shared network resources, and does not allocate specifically for the $S_d$ any network resources over the first network hop, and configures the $S_d$ to use network resources that were already allocated for the $S_p$. Optionally, the resource reservation network is an HDBaseT® network, and allocating network resources to a session includes allocating network bandwidth to the session.

Figure 2:
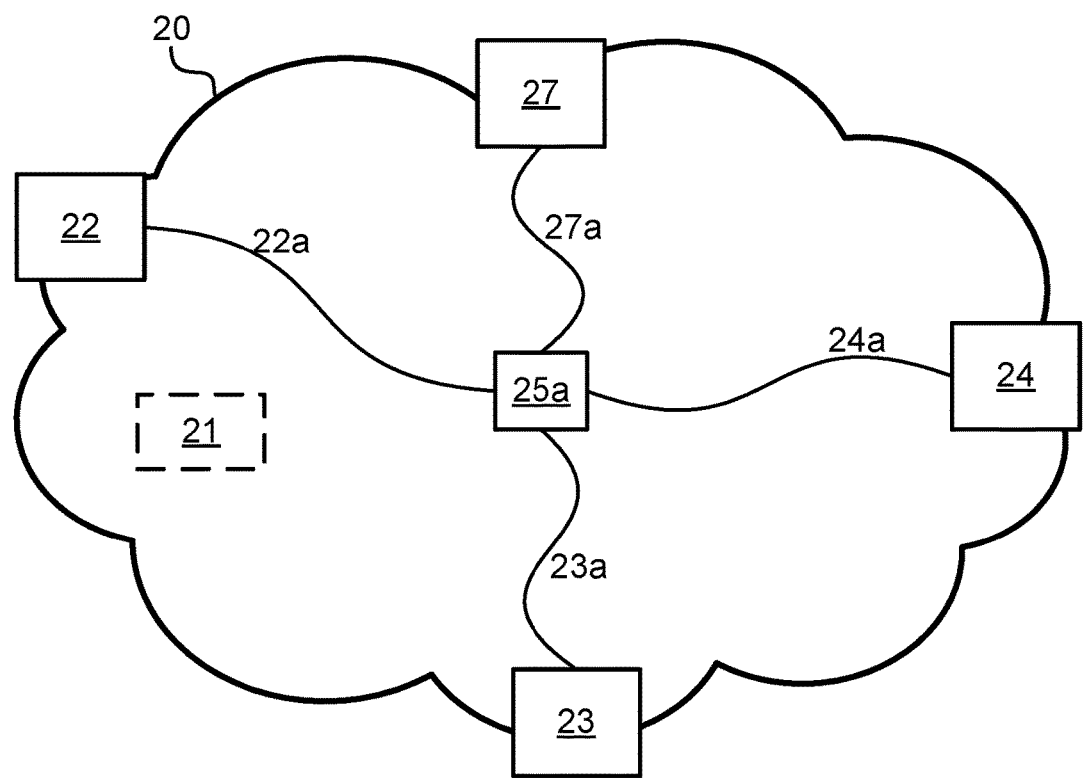
FIG. 2 illustrates one embodiment of a resource reservation network that maintains low latency variation of co-shared sessions.

FIG. 2 illustrates one embodiment of a resource reservation network 20 that maintains low latency variation of co-shared sessions. A SCM 21 creates a bi-directional parent session ($S_p$), between a first session partner 22 and a second session partner 23, by: allocating co-shared network resources over a first network hop 22a directly connected to the first session partner 22, and allocating network resources over a second network hop 23a directly connected to the second session partner 23. The first network hop 22a and the second network hop 23a are connected through a network entity 25a, such as a network router and/or a network switch. After creating the $S_p$, the network resources allocated to the $S_p$ guarantee a maximum end-to-end latency variation (e2eLV) below 100 microseconds for communications over the $S_p$.

The SCM 21 calculates a maximum e2eLV of a potential bi-directional derivative session ($S_d$) between the first session partner 22 and a third session partner 24. The potential $S_d$ utilizes network resources over a third network hop 24a directly connected to the third session partner 24, and utilizes the co-shared network resources over the first network hop 22a. It is noted that sentence such as "utilizes the co-shared network resources" are to be interpreted as "utilizes at least some of the co-shared network resources", where some may span from a very small portion to 100% of the co-shared network resources. And responsive to determining that the maximum e2eLV of the $S_d$ being below 100 microseconds, the SCM creates the $S_d$.

The SCM 21 may calculate the maximum e2eLV of a second potential $S_d$ between the first session partner 22 and a fourth session partner 27 that is connected through network hop 27a to the network entity 25a. The second potential $S_d$ requires allocation of network resources over the fourth network hop 27a, and utilizes the co-shared network resources over the first network hop 22a. And responsive to determining that the expected maximum e2eLV of the second $S_d$ being above 100 microseconds, the SCM 21 refrains from creating the second $S_d$.

Additionally or alternatively, the SCM 21 may calculate the maximum e2eLV of the second potential $S_d$ between the first session partner 22 and the fourth session partner 27. And responsive to determining that the expected maximum e2eLV of the $S_p$ can exceed 100 microseconds, the SCM 21 refrains from creating the second $S_d$.

Optionally, the resource reservation network illustrated in FIG. 2 further includes a fourth session partner and a fourth network hop directly connected to the fourth session partner. The SCM calculates the maximum e2eLV of a second potential $S_d$ between the first session partner and the fourth session partner; wherein the second potential $S_d$ requires allocation of network resources over the fourth network hop, and utilizes the co-shared network resources over the first network hop. And the SCM refrains from creating the second $S_d$ responsive to determining that the expected maximum e2eLV of the second $S_d$ being above 100 microseconds.

In another option, the resource reservation includes a fourth session partner and a fourth network hop directly connected to the fourth session partner. The SCM calculates the maximum e2eLV of a second potential $S_d$ between the first session partner and the fourth session partner; wherein the second potential $S_d$ requires allocation of network resources over the fourth network hop, and utilizes the co-shared network resources over the first network hop. And the SCM refrains from creating the second $S_d$ responsive to determining that the expected maximum e2eLV of the $S_p$ can exceed 100 microseconds as a result of creating the second $S_d$.

Still referring to the resource reservation network illustrated in FIG. 2, the resource reservation network may guarantee maximum e2eLV below 50 microseconds for each of the $S_p$ and the $S_d$. Additionally or alternatively, the resource reservation network may guarantee maximum e2eLV below 20 microseconds for each of the $S_p$ and the $S_d$. Optionally, the packet length and maximum burst size are limited in order to guarantee the e2eLV. Optionally, the $S_d$ utilizes the co-shared network resources, and the SCM is further configured not to allocate specifically for the $S_d$ any network resources over the first network hop. Optionally, the SCM utilizes a routing protocol while creating the $S_p$ and the $S_d$ in order to guarantee that all data packets traveling in either direction of each of the $S_p$ and the $S_d$ travel over the same network paths. Optionally, the $S_p$ utilizes the same $S_p$ identification value (ID) for both directions, and the $S_d$ utilizes the same $S_d$ ID for both directions. Optionally, the SCM is implemented within at least one of the session partners, and/or within a switch element, and/or within a central network controller. And optionally, the resource reservation network is an HDBaseT® network, and allocating network resources to a session includes allocating network bandwidth to the session.

In one embodiment, method for maintaining low latency variation of co-shared sessions over a resource reservation network includes the following steps: In step 1, creating a bi-directional parent session ($S_p$), between first and second session partners, by: allocating co-shared network resources to the $S_p$ over a first network hop directly connected to the first session partner, and allocating network resources over a second network hop directly connected to the second session partner. The network resources allocated to the $S_p$ guarantee maximum end-to-end latency variation (e2eLV) below 100 microseconds.

In step 2, calculating maximum e2eLV of a potential bi-directional derivative session ($S_d$) between the first session partner and a third session partner. The potential $S_d$ utilizes network resources over a third network hop that is connected to the third session partner, and utilizes the co-shared network resources over the first network hop.

And in step 3, creating the $S_d$ responsive to determining that the maximum e2eLV of the potential $S_d$ being below 100 microseconds.

In one embodiment, the method may further include calculating maximum e2eLV of a second potential $S_d$ between the first session partner and a fourth session partner. The second potential $S_d$ utilizes allocated network resources over a fourth network hop directly connected to the fourth session partner, and utilizes the co-shared network resources over the first network hop. And refraining from creating the second $S_d$ responsive to determining that the expected maximum e2eLV of the second potential $S_d$ being above 100 microseconds.

In another embodiment, the method may further include calculating maximum e2eLV of a second potential $S_d$ between the first session partner and a fourth session partner. The second potential $S_d$ utilizes allocated network resources over a fourth network hop directly connected to the fourth session partner, and utilizes the co-shared network resources over the first network hop. And refraining from creating the second $S_d$ responsive to determining that the expected maximum e2eLV of the $S_p$ can exceed 100 microseconds as a result of creating the second $S_d$.

Optionally, the resource reservation network guarantees maximum e2eLV below 50 microseconds for each of the $S_p$ and the $S_d$. Optionally, the resource reservation network guarantees maximum e2eLV below 20 microseconds for each of the $S_p$ and the $S_d$. In one embodiment, the network guarantees a certain maximum e2eLV to the $S_p$, and the other $S_d$ are created only if the network can continue to guarantee the certain maximum e2eLV to all the other co-shared sessions that have guaranteed e2eLV. The method may further include guarantying the e2eLV by limiting the packet length and maximum burst size below predetermined levels. Optionally, the $S_d$ utilizes the co-shared network resources, and does not allocate specifically for the $S_d$ any additional network resources over the first network hop. Optionally, the method may further include utilizing a routing protocol while creating the $S_p$ and the $S_d$ in order to guarantee that all data packets traveling in either direction of each of the $S_p$ and the $S_d$ travel over the same network paths. Optionally, the $S_p$ utilizes the same $S_p$ identification value (ID) for both directions, and the $S_d$ utilizes the same $S_d$ ID for both directions. Optionally, at least one of the session partners manages the creation of at least one of the $S_p$ and the $S_d$. Optionally, a switch element manages the creation of at least one of the $S_p$ and the $S_d$. And optionally, a central network controller manages the creation of at least one of the $S_p$ and the $S_d$.

Figure 3:
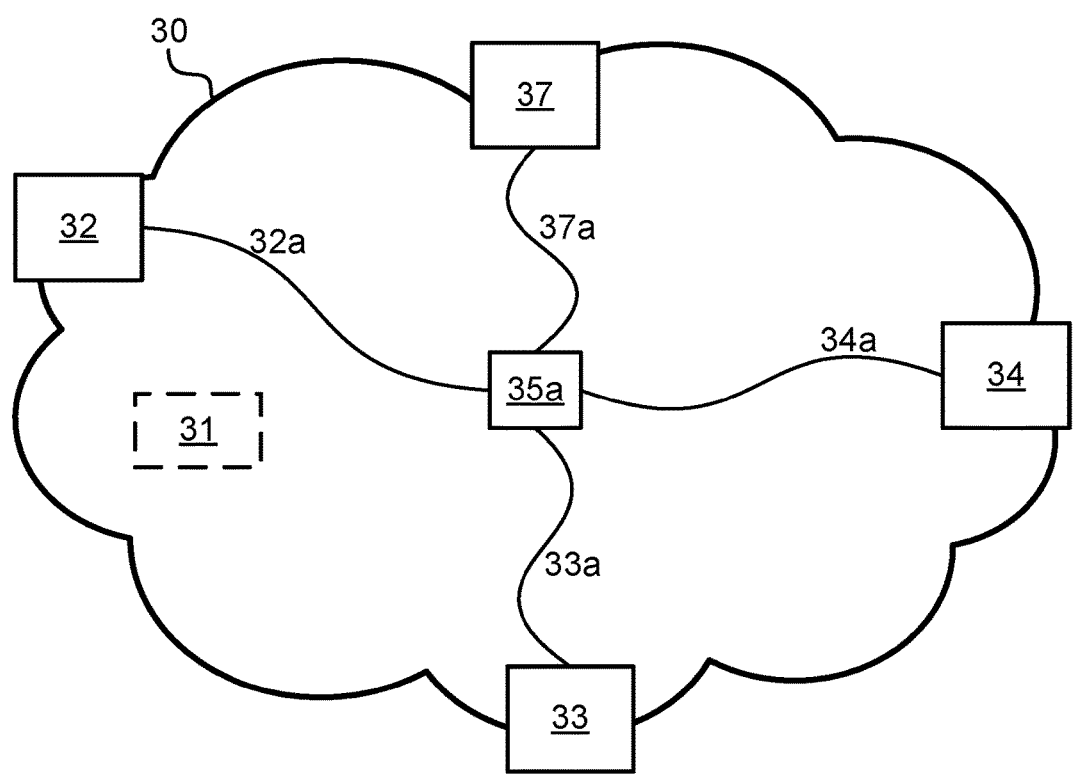
FIG. 3 illustrates one embodiment of a resource reservation network that maintains low latency of co-shared sessions.

FIG. 3 illustrates one embodiment of a resource reservation network 30 that maintains low latency of co-shared sessions. A SCM 31 creates a bi-directional parent session ($S_p$), between a first session partner 32 and a second session partner 33, by: allocating co-shared network resources over a first network hop 32a directly connected to the first session partner 32, and allocating network resources over a second network hop 33a directly connected to the second session partner 33. The first network hop 32a and the second network hop 33a are connected through a network entity 35a, such as a network router and/or a network switch. After creating the $S_p$, the network resources allocated to the $S_p$ guarantee a maximum end-to-end latency (e2eL) below 300 microseconds for communications over the $S_p$.

The SCM 31 calculates a maximum e2eL of a potential bi-directional derivative session ($S_d$) between the first session partner 32 and a third session partner 34. The potential $S_d$ utilizes network resources over a third network hop 34a directly connected to the third session partner 34, and utilizes the co-shared network resources over the first network hop 32a. And responsive to determining that the maximum e2eL of the $S_d$ being below 300 microseconds, the SCM creates the $S_d$.

The SCM 31 may calculate the maximum e2eL of a second potential $S_d$ between the first session partner 22 and a fourth session partner 37 that is connected through network hop 37a to the network entity 35a. The second potential $S_d$ requires allocation of network resources over the fourth network hop 37a, and utilizes the co-shared network resources over the first network hop 32a. And responsive to determining that the expected maximum e2eL of the second $S_d$ being above 300 microseconds, the SCM 31 refrains from creating the second $S_d$.

Additionally or alternatively, the SCM 31 may calculate the maximum e2eL of the second potential $S_d$ between the first session partner 32 and the fourth session partner 37. And responsive to determining that the expected maximum e2eL of the $S_p$ can exceed 300 microseconds, the SCM 31 refrains from creating the second $S_d$.

Optionally, the resource reservation network illustrated in FIG. 3 further includes a fourth session partner and a fourth network hop directly connected to the fourth session partner. The SCM calculates the maximum e2eL of a second potential $S_d$ between the first session partner and the fourth session partner. The second potential $S_d$ requires allocation of network resources over the fourth network hop, and utilizes the co-shared network resources over the first network hop. And the SCM refrains from creating the second $S_d$ responsive to determining that the expected maximum e2eL of the second $S_d$ being above 300 microseconds.

In another option, the resource reservation network includes a fourth session partner and a fourth network hop directly connected to the fourth session partner. The SCM calculates the maximum e2eL of a second potential $S_d$ between the first session partner and the fourth session partner. The second potential $S_d$ requires allocation of network resources over the fourth network hop, and utilizes the co-shared network resources over the first network hop. And the SCM refrains from creating the second $S_d$ responsive to determining that as a result of creating the second $S_d$, the expected maximum e2eL of the $S_p$ can exceed 300 microseconds.

In one embodiment, the resource reservation network guarantees maximum e2eL below 100 microseconds for each of the $S_p$ and the $S_d$. Optionally, the packet length and maximum burst size are limited in order to guarantee the e2eL. Optionally, the $S_d$ utilizes the co-shared network resources, and the SCM does not allocate specifically for the $S_d$ any network resources over the first network hop. Optionally, the SCM utilizes a routing protocol while creating the $S_p$ and the $S_d$ in order to guarantee that all data packets traveling in either direction of each of the $S_p$ and the $S_d$ travel over the same network paths. Optionally, the $S_p$ utilizes the same $S_p$ identification value (ID) for both directions, and the $S_d$ utilizes the same $S_d$ ID for both directions. Optionally, the SCM is implemented within at least one of the session partners, and/or within a switch element, and/or within a central network controller. And optionally, the resource reservation network is an HDBaseT® network, and allocating network resources to a session includes allocating network bandwidth to the session.

In one embodiment, a method for maintaining low latency of co-shared sessions over a resource reservation network includes the following steps: In step 1, creating a bi-directional parent session ($S_p$), between first and second session partners, by: allocating co-shared network resources to the $S_p$ over a first network hop directly connected to the first session partner, and allocating network resources over a second network hop directly connected to the second session partner. The network resources allocated to the $S_p$ guarantee maximum end-to-end latency (e2eL) below 300 microseconds.

In step 2, calculating maximum e2eL of a potential bi-directional derivative session ($S_d$) between the first session partner and a third session partner. The potential $S_d$ utilizes network resources over a third network hop directly connected to the third session partner, and utilizes the co-shared network resources over the first network hop.

And in step 3, creating the $S_d$ responsive to determining that the maximum e2eL of the $S_d$ being below 300 microseconds.

The method may further include calculating maximum e2eL of a second potential $S_d$ between the first session partner and a fourth session partner. The second potential $S_d$ utilizes network resources over a fourth network hop directly connected to the fourth session partner, and utilizes the co-shared network resources over the first network hop. And refraining from creating the second $S_d$ responsive to determining that the maximum e2eL of the second $S_d$ being above 300 microseconds.

Alternatively, the method may further include calculating maximum e2eL of a second potential $S_d$ between the first session partner and a fourth session partner. The second potential $S_d$ utilizes network resources over a fourth network hop directly connected to the fourth session partner, and utilizes the co-shared network resources over the first network hop. And not creating the $S_d$ responsive to determining that the expected maximum e2eL of the $S_p$ can exceed 300 microseconds as a result of creating the second $S_d$.

In one embodiment, the method may further include guarantying maximum e2eL below 100 microseconds for each of the $S_p$ and the $S_d$. Additionally or alternatively, the method may further include guarantying the e2eL by limiting the packet length and maximum burst size. Optionally, the $S_d$ utilizes the co-shared network resources, and not allocating specifically for the $S_d$ any network resources over the first network hop. The method may further include utilizing a routing protocol while creating the $S_p$ and the $S_d$ in order to guarantee that all data packets traveling in either direction of each of the $S_p$ and the $S_d$ travel over the same network paths. And optionally, the $S_p$ may utilize the same $S_p$ identification value (ID) for both directions, and the $S_d$ may utilize the same $S_d$ ID for both directions.

Figure 4:
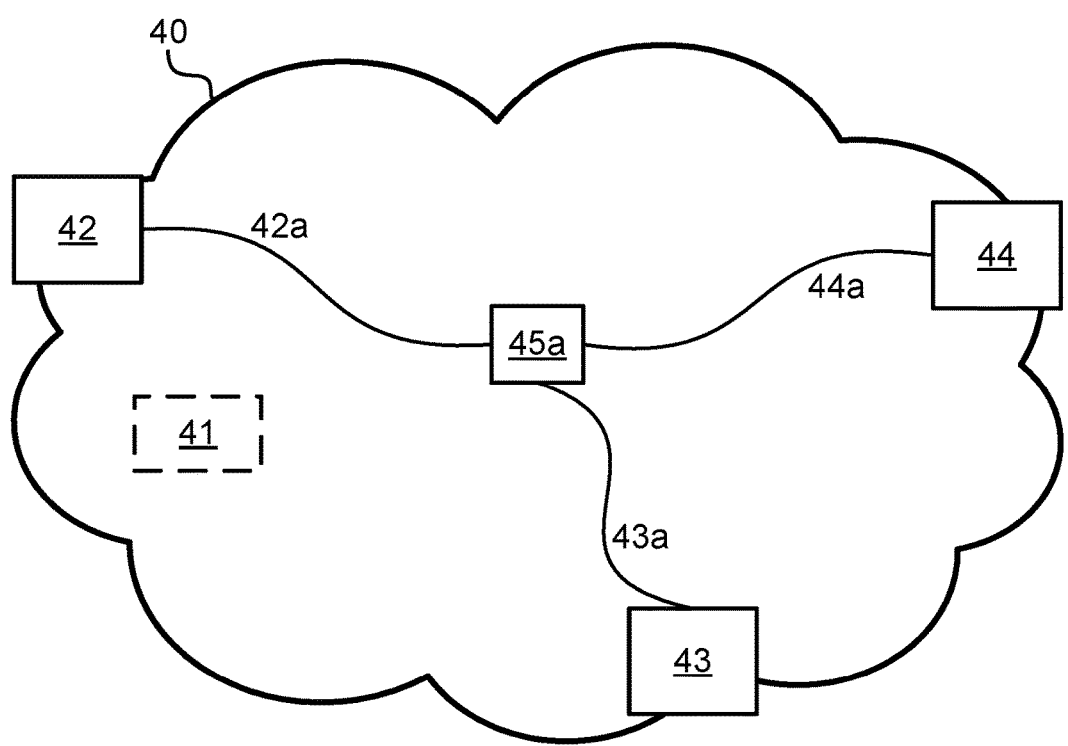
FIG. 4 illustrates one embodiment of a resource reservation network that switches fast between bi-directional co-shared sessions having different network paths.

FIG. 4 illustrates one embodiment of a resource reservation network 40 that switches fast between bi-directional co-shared sessions having different network paths. A SCM 41 creates a bi-directional parent session ($S_p$), between a first session partner 42 and a second session partner 43, by: allocating co-shared network resources over a first network hop 42a directly connected to the first session partner 42, and allocating network resources over a second network hop 43a directly connected to the second session partner 43. The first network hop 42a and the second network hop 43a are connected through a network entity 45a, such as a network router and/or a network switch. The SCM 11 also creates a bi-directional derivative session ($S_d$) between the first session partner 42 and a third session partner 44, by: allocating network resources to the $S_d$ over a third network hop 44a that is directly connected to the third session partner 44, and not allocating specifically for the $S_d$ all the network resources required for the $S_d$ over the first network hop 42a. It is noted that sentences such as "not allocating specifically for the $S_d$ all the network resources required for the $S_d$ over the first network hop" mean that the $S_d$ has to utilize at least some of the co-shared network resources for its operation.

The resource reservation network 40 is able to switch fast between a first state where the $S_p$ utilizes more than 50% of the co-shared network resources, to a second state where the $S_d$ utilizes more than 50% of the co-shared network resources, without terminating the $S_p$. Wherein the fast switching is performed within a duration that is less than half the duration required to create the $S_d$. It is noted that sentences such as "the duration required to create the $S_d$" refer to the duration it takes to create the $S_d$ without prior arrangements or prior calculations, which may reduce the duration to create the $S_d$ from scratch.

Still referring to the resource reservation network illustrated in FIG. 4, the $S_p$ may utilize in the first state more than 90% of the co-shared network resources on the first network hop, and the $S_d$ may utilize in the second state more than 90% of the co-shared network resources on the first network hop. Optionally, the resource reservation network switches between the first and second states within a duration that is less than one-tenth the duration required for the resource reservation network to create the $S_d$.

Optionally, the $S_p$ may utilize in the first state more than 99% of the co-shared network resources on the first network hop, and the $S_d$ may utilize in the second state more than 99% of the co-shared network resources on the first network hop. Optionally, the resource reservation network switches between the first and second states within less than 10 milliseconds. Optionally, the SCM does not allocate specifically for the $S_d$ any network resources required for the $S_d$ over the first network hop. Optionally, the resource reservation network is an HDBaseT® network. Optionally, the SCM is implemented within the first session partner, and/or within a central network controller. And optionally, the resource reservation network is an HDBaseT® network, and allocating network resources to a session includes allocating network bandwidth to the session.

In one embodiment, method for fast switching between bi-directional co-shared sessions having different network paths over a resource reservation network includes the following steps: In step 1, creating a bi-directional parent session ($S_p$) between first and second session partners, by: allocating co-shared network resources over a first network hop directly connected to the first session partner, and allocating network resources over a second network hop directly connected to the second session partner.

In step 2, creating a bi-directional derivative session ($S_d$) between the first session partner and a third session partner, by: allocating network resources to the $S_d$ over a third network hop directly connected to the third session partner, and not allocating specifically for the $S_d$ all the network resources required for the $S_d$ over the first network hop.

And in step 3, switching between a first state where the $S_p$ utilizes more than 50% of the co-shared network resources, to a second state where the $S_d$ utilizes more than 50% of the co-shared network resources, without terminating the $S_p$; wherein the switching is performed within a duration that is less than half the duration required to create the $S_d$.

In one embodiment of the method, the $S_p$ utilizes in the first state more than 90% of the co-shared network resources, and the $S_d$ utilizes in the second state more than 90% of the co-shared network resources. Optionally, the switching between the first and second states is performed within a duration that is less than one-tenth the duration required to create the $S_d$. Additionally or alternatively, the $S_p$ utilizes in the first state more than 99% of the co-shared network resources, and the $S_d$ utilizes in the second state more than 99% of the co-shared network resources. Additionally or alternatively, the switching between the first and second states is performed within less than 10 milliseconds. Optionally, the creating of the $S_d$ does not allocate specifically for the $S_d$ any network resources required for the $S_d$ over the first network hop. Optionally, the resource reservation network is an HDBaseT® network. Optionally, the first session partner manages the creating of the $S_p$ and the switching between the first and second states. Alternatively, a central network controller manages the creating of the $S_p$ and the switching between the first and second states.

In some cases, a network architecture based on bi-directional co-shared sessions (i.e., which defines both directions of the co-shared sessions, and not just unidirectional co-shared sessions) provides advantages over a network architecture based on unidirectional co-shared sessions. For example, in some cases utilizing bi-directional co-shared sessions may simplify the management of the network, and/or enable performances that are complicated to achieve with unidirectional co-shared sessions.

Figure 5:
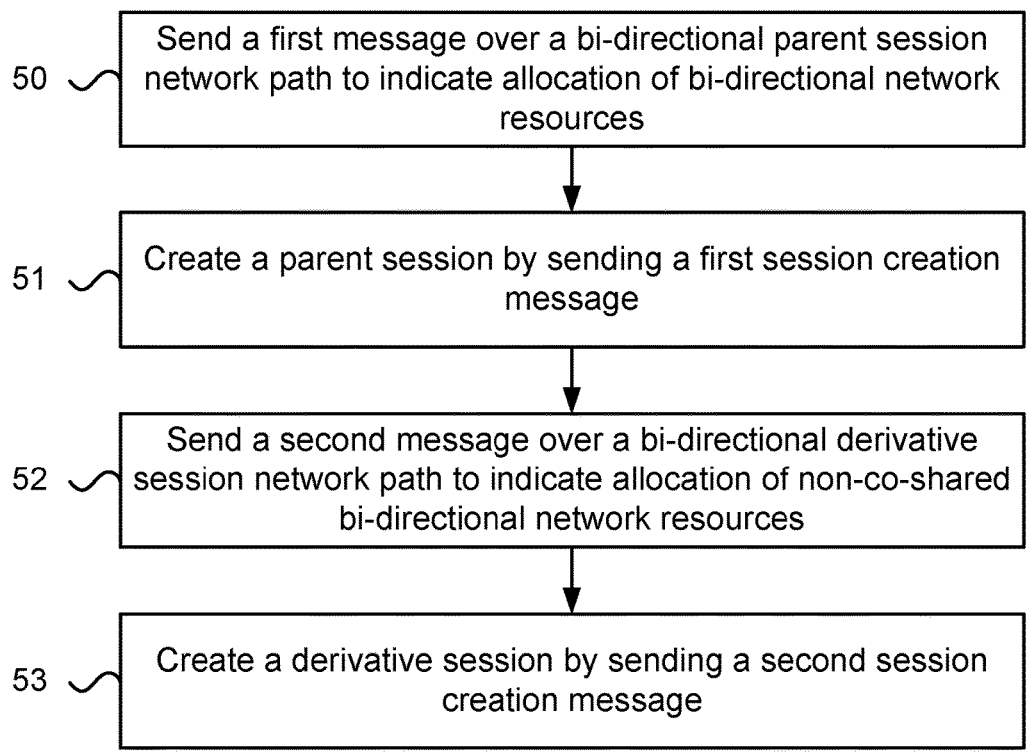
FIG. 5 illustrates one embodiment of a method for creating bi-directional co-shared sessions over a resource reservation network.

FIG. 5 illustrates one embodiment of a method for creating bi-directional co-shared sessions over a resource reservation network. The method includes at least the following steps: In step 50, sending a first message over a bi-directional parent session network path ($P_p$) between first and second session partners. The first message indicates bi-directional network resources to be allocated by each network entity along the $P_p$ in order to create a bi-directional parent session ($S_p$). The $S_p$ includes co-shared network resources over a first network hop directly connected to the first session partner, and non-co-shared network resources over a second network hop directly connected to the second session partner.

In step 51, responsive to the network entities along the $P_p$ indicating in the first message that they can allocate the bi-directional network resources to the $S_p$, creating the $S_p$ by sending a first session creation message to the network entities along the $P_p$.

In step 52, sending a second message over a bi-directional derivative session network path ($P_d$) between the first session partner and a third session partner. The second message indicates non-co-shared bi-directional network resources to be allocated by each non-co-shared network entity along the $P_d$ in order to create a bi-directional derivative session ($S_d$). The $S_d$ includes co-shared network resources over the first network hop, and non-co-shared network resources over a third network hop directly connected to the third session partner.

And in step 53, responsive to the non-co-shared network entities along the $P_d$ indicating in the second message that they can allocate the non-co-shared bi-directional network resources to the $S_d$, creating the $S_d$ by sending a second session creation message to the network entities along the $P_d$.

The method may further include the optional step of registering in each co-shred network entity along the $P_d$ the session identification value of the $S_d$ as a co-shared session with the $S_p$. Optionally, the second message also indicates co-shared bi-directional network resources to be allocated by each co-shared network entity along the $P_d$ to create the $S_d$; and responsive to the co-shared network entities along the $P_d$ indicating in the second message that they can allocate the co-shared bi-directional network resources to the $S_d$, sending the second session creation message.

Optionally, the method further includes sending a third message over a second bi-directional derivative session network path ($P_{d2}$) between the first session partner and a fourth session partner. The third message indicates non-co-shared bi-directional network resources to be allocated by each non-co-shared network entity along the $P_{d2}$ to create a second bi-directional derivative session ($S_{d2}$). The $S_{p2}$ includes co-shared network resources over the first network hop, and non-co-shared network resources over a fourth network hop directly connected to the fourth session partner. And not creating the $S_{d2}$ responsive to detecting that at least one non-co-shared network entity along the $P_{d2}$ cannot allocate the indicated non-co-shared bi-directional network resources for the $S_{d2}$.

Alternatively, the method may further include sending a third message over a second bi-directional derivative session network path ($P_{d2}$) between the first session partner and a fourth session partner. The third message indicates both shared and non-co-shared bi-directional network resources to be allocated along the $P_{d2}$ to create a second bi-directional derivative session ($S_{d2}$). The $S_{p2}$ includes co-shared network resources over the first network hop, and non-co-shared network resources over a fourth network hop directly connected to the fourth session partner. And not creating the $S_{d2}$ responsive to detecting that at least one co-shared network entity along the $P_{d2}$ cannot allocate the indicated co-shared bi-directional network resources for the $S_{d2}$.

In one example, when a network entity along a potential network path receives a message that requests network resource allocation for a new co-shared session, but cannot make the allocation, the network entity rolls back a message to the previous network entities in order to notify them to release the allocated network resources.

In another example, when creating a $S_d$, each co-shared node (on the network paths of both the $S_p$ and the $S_d$) operates under an assumption that the co-shared sessions do not use simultaneously more bandwidth than the total bandwidth allocated to the $S_p$. Thus, the co-shared node does not take in account the bandwidth used by the one or more $S_d$ when calculating whether it can allocate the indicated bi-directional network resources for a $S_d$. A node that is not a co-shared node (such as a node outside the network paths of the $S_p$) needs to take in account the bandwidth used by the $S_d$ in order to calculate whether it can allocate the indicated bi-directional network resources for the $S_d$.

Optionally, each $S_d$ reports to a central network controller its session usage property, which indicates the amount of bandwidth to be reserved for the $S_d$. A certain $S_d$ can reserve bandwidth only from the remaining bandwidth after deducting the other session usage properties that already have been reserved, in order to ensure that the total reserved bandwidth does not reach the total bandwidth allocated to the $S_p$.

In one embodiment, resource reservation network includes a session creation module (SCM). The SCM sends a first message over a bi-directional parent session network path ($P_p$) between first and second session partners. The first message indicates bi-directional network resources to be allocated by each network entity along the $P_p$ to create a bi-directional parent session ($S_p$). The $S_p$ includes co-shared network resources over a first network hop directly connected to the first session partner, and non-co-shared network resources over a second network hop directly connected to the second session partner.

The SCM further creates the $S_p$, by sending a first session creation message to the network entities along the $P_p$, after the network entities along the $P_p$ indicate in the first message that they can allocate the bi-directional network resources to the $S_p$.

The SCM further sends a second message over a bi-directional derivative session network path ($P_d$) between the first session partner and a third session partner. The second message indicates non-co-shared bi-directional network resources to be allocated by each non-co-shared network entity along the $P_d$ to create a bi-directional derivative session ($S_d$). The $S_d$ includes co-shared network resources over the first network hop, and non-co-shared network resources over a third network hop directly connected to the third session partner.

And the SCM further creates the $S_d$, by sending a second session creation message to the network entities along the $P_d$, after the non-co-shared network entities along the $P_d$ indicate in the second message that they can allocate the non-co-shared bi-directional network resources for the $S_d$.

The above embodiment may have various options. The co-shared network entities along the $P_d$ may register the session identification value of the $S_d$ as a co-shared session with the $S_p$. Additionally or alternatively, the second message also indicates co-shared bi-directional network resources to be allocated by each co-shared network entity along the $P_d$ to create the $S_d$; and the SCM sends the second session creation message responsive to the co-shared network entities along the $P_d$ indicating in the second message that they can allocate the co-shared bi-directional network resources to the $S_d$.

Optionally, the SCM sends a third message over a second bi-directional derivative session network path ($P_{d2}$) between the first session partner and a fourth session partner. The third message indicates non-co-shared bi-directional network resources to be allocated by each non-co-shared network entity along the $P_{d2}$ to create a second bi-directional derivative session ($S_{d2}$). The $S_{p2}$ includes co-shared network resources over the first network hop, and non-co-shared network resources over a fourth network hop directly connected to the fourth session partner. And the SCM does not create the $S_{d2}$ responsive to detecting that at least one non-co-shared network entity along the $P_{d2}$ cannot allocate the indicated non-co-shared bi-directional network resources for the $S_{d2}$.

In another option, the SCM sends a third message over a second bi-directional derivative session network path ($P_{d2}$) between the first session partner and a fourth session partner. The third message indicates both shared and non-co-shared bi-directional network resources to be allocated along the $P_{d2}$ to create a second bi-directional derivative session ($S_{d2}$). The $S_{p2}$ includes co-shared network resources over the first network hop, and non-co-shared network resources over a fourth network hop directly connected to the fourth session partner. And the SCM does not create the $S_{d2}$ responsive to detecting that at least one co-shared network entity along the $P_{d2}$ cannot allocate the indicated co-shared bi-directional network resources for the $S_{d2}$.

In still another option, the network entities are one or more of the following: a network switch, a network router, and a network repeater. Optionally, the SCM is implemented in a network controller coupled to the network. And optionally, the resource reservation network is an HDBaseT® network, and allocating network resources to a session includes allocating network bandwidth to the session.

Figure 6:
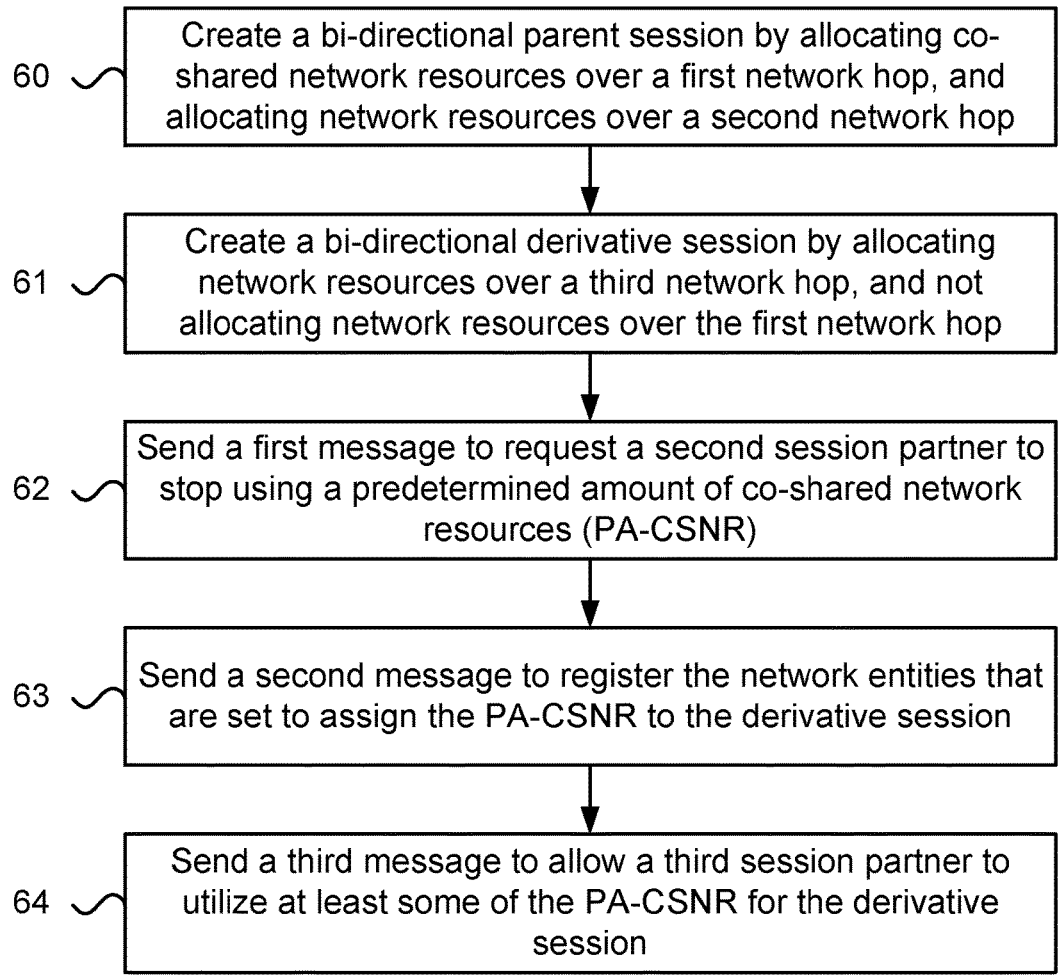
FIG. 6 illustrates one embodiment of a method for fast switching between bi-directional co-shared sessions having different network paths over a resource reservation network.

FIG. 6 illustrates one embodiment of a method for fast switching between bi-directional co-shared sessions having different network paths over a resource reservation network. The method includes at least the following steps: In step 60, creating a bi-directional parent session ($S_p$) between first and second session partners, by: allocating co-shared network resources over a first network hop directly connected to the first session partner, and allocating network resources over a second network hop directly connected to the second session partner.

In step 61, creating a bi-directional derivative session ($S_d$) between the first session partner and a third session partner, by: allocating network resources to the $S_d$ over a third network hop directly connected to the third session partner, and not allocating specifically for the $S_d$ all the network resources required for the $S_d$ over the first network hop.

And reassigning a predetermined amount of the co-shared network resources (PA-CSNR) assigned to the $S_p$ using the following steps: In step 62, sending a first message, from the first session partner to the second session partner, to request the second session partner to stop using the PA-CSNR. In step 63, sending a second message from the second session partner to the first session partner, wherein each of the network entities that operates the co-shared network resources for the $S_p$ registers in the second message whether it is set to assign the PA-CSNR to the $S_d$. And in step 64, sending a third message, from the first session partner to the third session partner, which allows the third session partner to utilize at least some of the PA-CSNR for the $S_d$.

The method may further include the step of terminating the $S_d$ by releasing allocated network resources over the third network hop, and returning the co-shared network resources to the $S_p$. Optionally, the method further includes sending a termination message, from the first session partner to the third session partner or from the third session partner to the first session partner, in order to terminate the $S_d$.

Optionally, each of the network entities that operates the co-shared network resources for the $S_d$ registers in the third message that it assigned the PA-CSNR to the $S_d$. And the method may further include sending a fourth message, from the third session partner to the first session partner, to inform the first session partner that the co-shared network resources are assigned to the $S_d$.

In one embodiment, a resource reservation network include a SCM that creates a bi-directional parent session ($S_p$), between first and second session partners, by: allocating co-shared network resources over a first network hop directly connected to the first session partner, and allocating network resources over a second network hop directly connected to the second session partner.

The SCM further creates a bi-directional derivative session ($S_d$) between the first session partner and a third session partner, by: allocating network resources to the $S_d$ over a third network hop that is directly connected to the third session partner, and not allocating specifically for the $S_d$ all the network resources required for the $S_d$ over the first network hop.

And the SCM reassigns a predetermined amount of the co-shared network resources (PA-CSNR) assigned to the $S_p$ using the following steps: (i) sending a first message, from the first session partner to the second session partner, to request the second session partner to stop using the PA-CSNR, (ii) sending a second message from the second session partner to the first session partner, wherein each of the network entities that operates the co-shared network resources for the $S_p$ registers in the second message whether it is set to assign the PA-CSNR to the $S_d$, and (iii) sending a third message, from the first session partner to the third session partner, which allows the third session partner to utilize at least some of the PA-CSNR for the $S_d$.

Optionally, SCM terminates the $S_d$ by releasing allocated network resources over the third network hop, and returning the co-shared network resources to the $S_p$. And optionally, the resource reservation network is an HDBaseT® network, and allocating network resources to a session includes allocating network bandwidth to the session.

Herein, a predetermined value, such as a predetermined confidence level or a predetermined threshold, is a fixed value and/or a value determined any time before performing a calculation that compares a certain value with the predetermined value. A value is also considered to be a predetermined value when the logic, used to determine whether a threshold that utilizes the value is reached, is known before start of performing computations to determine whether the threshold is reached.

In this description, references to "one embodiment" (and its variations) mean that the feature being referred to may be included in at least one embodiment of the invention. Moreover, separate references to "one embodiment", "some embodiments", "another embodiment", and "still another embodiment" may refer to the same embodiment, may illustrate different aspects of an embodiment, and/or may refer to different embodiments.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the order of steps of the methods, or to details of implementation of the devices, set in the description, drawings, or examples. Moreover, individual blocks illustrated in the figures may be functional in nature and therefore may not necessarily correspond to discrete hardware elements. In the claims, the terms "first", "second" and so forth are to be interpreted merely as ordinal designations, and shall not be limited in themselves.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

We claim:

1. A method for fast switching between bi-directional co-shared sessions having different network paths over a resource reservation network, comprising:
   creating a bi-directional parent session ($S_p$) between first and second session partners, by: allocating co-shared network resources over a first network hop directly connected to the first session partner, and allocating network resources over a second network hop directly connected to the second session partner;
   creating a bi-directional derivative session ($S_d$) between the first session partner and a third session partner, by: allocating network resources to the $S_d$ over a third network hop directly connected to the third session partner, and not allocating specifically for the $S_d$ all the network resources required for the $S_d$ over the first network hop; and reassigning a predetermined amount of the co-shared network resources (PA-CSNR) assigned to the $S_p$ using the following steps: (i) sending a first message, from the first session partner to the second session partner, to request the second session partner to stop using the PA-CSNR, (ii) sending a second message from the second session partner to the first session partner, wherein each of the network entities that operates the co-shared network resources for the $S_p$ registers in the second message whether it is set to assign the PA-CSNR to the $S_d$, and (iii) sending a third message, from the first session partner to the third session partner, which allows the third session partner to utilize at least some of the PA-CSNR for the $S_d$.

2. The method of claim 1, further comprising terminating the $S_d$ by releasing allocated network resources over the third network hop, and returning the co-shared network resources to the $S_p$.

3. The method of claim 2, further comprising sending a termination message, from the first session partner to the third session partner or from the third session partner to the first session partner, in order to terminate the $S_d$.

4. The method of claim 1, wherein each of the network entities that operates the co-shared network resources for the $S_d$ is configured to register in the third message that it assigned the PA-CSNR to the $S_d$.

5. The method of claim 4, further comprising sending a fourth message, from the third session partner to the first session partner, to inform the first session partner that the co-shared network resources are assigned to the $S_d$.

6. A resource reservation network, comprising:
a computer, and first, second and third network hops;
the computer is configured to create a bi-directional parent session ($S_p$), between first and second session partners, by: allocating co-shared network resources over the first network hop directly connected to the first session partner, and allocating network resources over the second network hop directly connected to the second session partner;
the computer is further configured to create a bi-directional derivative session ($S_d$) between the first session partner and a third session partner, by: allocating network resources to the $S_d$ over the third network hop that is directly connected to the third session partner, and not allocating specifically for the $S_d$ all the network resources required for the $S_d$ over the first network hop; and
the computer is further configured to reassign a predetermined amount of the co-shared network resources (PA-CSNR) assigned to the $S_p$ using the following steps: (i) sending a first message, from the first session partner to the second session partner, to request the second session partner to stop using the PA-CSNR, (ii) sending a second message from the second session partner to the first session partner, wherein each of the network entities that operates the co-shared network resources for the $S_p$ registers in the second message whether it is set to assign the PA-CSNR to the $S_d$, and (iii) sending a third message, from the first session partner to the third session partner, which allows the third session partner to utilize at least some of the PA-CSNR for the $S_d$.

7. The resource reservation network of claim 6, wherein the computer is further configured to terminate the $S_d$ by releasing allocated network resources over the third network hop, and returning the co-shared network resources to the $S_p$.

8. The resource reservation network of claim 6, wherein the resource reservation network is an HDBaseT® network, and allocating network resources to a session comprises allocating network bandwidth to the session.

* * * * *